United States Patent [19]

Wolfschwenger et al.

[11] Patent Number: 5,681,922
[45] Date of Patent: Oct. 28, 1997

[54] PROCESS FOR INCREASING THE PROPORTION OF THE β-MODIFICATION IN POLYPROPYLENE

[75] Inventors: Johannes Wolfschwenger, Niederneukirchen; Klaus Bernreitner, Linz, both of Austria

[73] Assignee: PCD Polymere Gesellschaft m.b.H., Linz, Austria

[21] Appl. No.: 747,398

[22] Filed: Nov. 12, 1996

Related U.S. Application Data

[63] Continuation of Ser. No. 440,259, May 12, 1995, abandoned.

[30] Foreign Application Priority Data

May 13, 1994 [AT] Austria ................................ A994/94

[51] Int. Cl.[6] .................................................... C08J 3/00
[52] U.S. Cl. ........................... 528/486; 524/397; 524/570; 525/366
[58] Field of Search ........................ 528/486; 525/366; 524/397

[56] References Cited

U.S. PATENT DOCUMENTS

| | | |
|---|---|---|
| 3,268,449 | 8/1966 | Colas et al. . |
| 3,299,029 | 1/1967 | Binbergen et al. . |
| 4,704,421 | 11/1987 | Teskin .................................. 524/287 |
| 4,801,637 | 1/1989 | McCullough, Jr. ................. 524/287 |
| 4,984,804 | 1/1991 | Yamada et al. ...................... 473/372 |
| 4,999,404 | 3/1991 | Matsuki .............................. 525/329.6 |
| 5,231,126 | 7/1993 | Shi et al. ............................. 524/296 |
| 5,300,549 | 4/1994 | Ward et al. . |

FOREIGN PATENT DOCUMENTS

| | | |
|---|---|---|
| 0177961B1 | 10/1985 | European Pat. Off. . |
| 1694914 | 1/1967 | Germany . |
| 1720580 | 3/1967 | Germany . |
| 3047153A1 | 7/1982 | Germany . |
| 3610644A1 | 10/1986 | Germany . |
| 763379 | 9/1980 | U.S.S.R. . |
| 1063812A | 12/1983 | U.S.S.R. . |
| 1195098 | 6/1970 | United Kingdom . |
| WO93/21262 | 10/1993 | WIPO . |

OTHER PUBLICATIONS

Derwent Abstracts, C93–154, 739.
Hawley's Condensed Chemical Dictionary, 11th Ed., NISax, ed., Van Nostrand Reinhold, New York, 1987, pp. 206 and 120.

*Primary Examiner*—Mark Nagumo
*Attorney, Agent, or Firm*—Wenderoth, Lind & Ponack

[57] ABSTRACT

Process for increasing the proportion of the β-modification in polypropylenes, in which the polypropylenes are melted together with dicarboxylic acid salts of metals of the 2nd main group of the Periodic Table as β nucleating agents and optionally with further conventional additives and are cooled, and polyropylenes which contain dicarboxylic acid salts of metals of the 2nd main group of the Periodic Table as β nucleating agents.

5 Claims, No Drawings

PROCESS FOR INCREASING THE PROPORTION OF THE β-MODIFICATION IN POLYPROPYLENE

This application is a continuation of now abandoned application, Ser. No. 08/440,259, filed May 12, 1995.

The invention relates to a process for increasing the proportion of the β crystal modification in polypropylenes.

On cooling, polypropylene usually crystallizes from the melt in the monoclinic α-modification. The hexagonal β-modification, which is distinguished in particular by better mechanical properties, in particular by an improved impact strength and higher stress cracking resistance, is preferably obtained by adding special β nucleating agents. The β-modification can be obtained, for example according to EP-B-177 961, by adding quinacridone pigments or, according to U.S. Pat. No. 5,231,126, by adding a 2-component mixture of a) a dibasic organic acid and b) an oxide, hydroxide or salt of a metal of group IIA of the Periodic Table to the polypropylene.

In addition to the improved mechanical properties, the most important feature of β-nucleated polypropylenes is that the β-modification melts in a temperature range as low as from 148° C. to 152° C. whereas the α-modification melts only above 160° C.

However, the addition of the known β-nucleating agents has in particular the disadvantage that, for example in the case of the quinacridone pigments, a pink coloration of the polypropylene results even when very small amounts of less than 10 ppm are used, which coloration is unsuitable for many applications. The β nucleating mixture according to U.S. Pat. No. 5,231,126 has in particular the disadvantage that a considerable part of the polypropylene may be present in the α-modification. Further disadvantages of the nucleating mixture according to U.S. Pat. No. 5,231,126 arise from the fact that the acids used evaporate under the conditions prevailing in modern extrusion plants, where temperatures of up to 270° C. or more are used and in addition the process is carried out under reduced pressure in order to remove low molecular weight contaminants. Moreover, these nucleating agents, too, result in a certain discoloration of the polypropylene, which is evident in particular from an excessively high yellowness index.

Accordingly, it was the object of the invention in particular to provide β nucleating agents for polypropylanes, which do not have the abovementioned disadvantages and with the aid of which polypropylenes having a high proportion of the β crystal modification are obtained. These problems could be solved by adding certain dicarboxylic acid salts to the polypropylenes.

The invention accordingly relates to a process for increasing the proportion of the β-modification in polypropylenes, in which the polypropylenes are melted together with dicarboxylic acid salts of metals of the 2nd main group of the Periodic Table as β nucleating agents and optionally with further conventional additives and are then cooled.

The invention furthermore relates to the use of dicarboxylic acid salts of metals of the 2nd main group of the Periodic Table as β nucleating agents in polypropylenes, as well as polypropylenes which contain dicarboxylic acid salts of metals of the 2nd main group of the Periodic Table as β nucleating agents.

There are several possibilities for determining the proportion of β-modification. On the one hand, the proportion of β-modification can be determined by the DSC analysis from the ratio of the melt peaks from the second heating-up stage according to the formula:

(β area). (α area+β area).

Another possibility is to determine the β content by means of the k value from the wide-angle X-ray pattern using the Turner-Jones equation (A. Turner-Jones et al., Makromol. Chem. 75 (1964) 134):

$$k = H\beta_1 / [H\beta_1 + (H\alpha_1 + H\alpha_2 + H\alpha_3)]$$

Here, $H\alpha_1$, $H\alpha_2$ and $H\alpha_3$ denote the height of the three strong α-peaks and $H\beta_1$ denotes the height of the strong β-peak. The k value is zero in the absence of the β-form and has the value 1 when only the β-modification is present. However, the values obtained by the two methods of determination are not necessarily identical. Since the β-modification is thermodynamically unstable and is converted into the energetically more advantageous α-modification above about 150° C., a certain proportion of the β-modification is converted into the α-modification in the DSC analysis at a heating rate of, for example, 10° C./min above 150° C. (time for heating up from 150° C. to the melting point of the α-PP), with the result that the DSC analysis finally always indicates a proportion of β-PP which is lower than that actually present.

The β nucleating agent according to the invention is a one-component system which is thermally stable up to about 400° C. With the present β nucleating agent, a proportion of β-modification of up to more than 80% (according to the DSC method) or having a Turner-Jones k value of at least 0.94 to 0.97 can be achieved without the addition of further additives. Similarly high proportions of β-modification are also achieved if the polypropylene contains further additives, such as, for example antioxidants, UV stabilizers, light stabilizers, lubricants, antiblocking agents, antistatic agents, colorants, chemical degrading agents and/or fillers.

According to the invention, mixtures of different dicarboxylic acid salts may also be used as β nucleating agents. The dicarboxylic acid salts used according to the invention preferably contain at least 7 C atoms, and salts of pimelic acid or suberic acid, for example Ca pimelate or Ca suberate, are particularly preferred.

The concentration of the β nucleating agents in the polypropylene is dependent in particular on the desired content of β-crystallites and is preferably 0.001 to 2, particularly preferably 0.01 to 1, % by weight, based on the polypropylene. Polypropylenes are to be understood as meaning both homopolymers of propylene and copolymers with further olefinic comonomers, such as, for example, ethylene, butene, pentene, 1-methylpentene, hexene and octene. The content of comonomers in the propylene copolymers is usually about 2 to 50 mol %. Both random and block copolymers may be used. Polypropylenes having a predominantly stereoregular arrangement in the polymer chain, such as, for example, isotactic or elastomeric polypropylenes, as obtainable, for example, as Daplen® from PCD-Polymere or described in DE-A-43 21 498, are preferably used. The proportion of the stereoregular polypropylenes in the polypropylenes used is preferably more than 80% by weight.

The invention furthermore relates to polypropylenes which contain dicarboxylic acid salts of metals of the 2nd main group of the Periodic Table as β nucleating agents.

The polypropylenes β-nucleated according to the invention can be further processed by conventional production methods, such as, for example, by extrusion or injection molding, to give finished articles having good mechanical properties.

COMPARATIVE EXAMPLE V1

A poplyropylene homopolymer powder (PP-B) having a melt flow index (MFI at 230° C./2.16 kg according to ISO 1133/DIN 53735) of 0.3 g/10 min (corresponding to Daplen BE 50 from PCD-Polymere) was mixed with 0.2% by weight of Ca stearate (from Faci) as the catalyst deactivator and internal lubricant, 0.1% by weight of Irgafos PEPQ (Ciba-Geigy) and 0.2% by weight of Irganox 1010 (Ciba-Geigy) as stabilizers or antioxidants and 0.3% by weight of distearyl thiodipropionate (DSTDP, from Ciba-Geigy) as heat stabilizer in an intensive mixer and was kneaded in a single-screw extruder at a melt temperature of 230° C. and granulated. The granules were pressed to give 2.5 mm thick sheets at 220° C. The Turner-Jones k value measured on these sheets was 0.01, corresponding to a proportion of 1% of β-polypropylene crystallites.

EXAMPLE 2-5

Sheets of polypropylene were produced analogously to Comparative Example V1, but the β nucleating agents and additives mentioned in Table 1 were added. The k values measured for the sheets are at least 0.94, corresponding to a content of at least 94% of β-polypropylene crystallites. The k values and the values measured by the DSC method for the percentage of β-crystals are likewise shown in Table 1.

The Ca salts of the dicarboxylic acids (pimelic and suberic acid) which were used as β nucleating agents were prepared by reacting one mol of dicarboxylic acid with one mol of $CaCO_3$ in aqueous ethanolic solution at 60 to 80° C. The salt which separated out as a fine precipitate was filtered off and dried until the weight was constant.

TABLE 1

| Ex. | Ca stearate (%) | Irgafos PEPQ (%) | Irganox 1010 (%) | DSTDP (%) | β nucleating agent (%) | k value (Turner-Jones) | β content (DSC %) |
|---|---|---|---|---|---|---|---|
| V1 | 0.2 | 0.1 | 0.2 | 0.3 | | 0.01 | less than 2 |
| 2 | 0.2 | 0.1 | 0.2 | 0.3 | 0.1 Ca pimelate | 0.97 | 70.4 |
| 3 | | 0.1 | 0.2 | 0.3 | 0.1 Ca pimelate | 0.96 | 73.6 |
| 4 | | 0.1 | 0.2 | 0.3 | 0.1 Ca suberate | 0.94 | 79.6 |
| 5 | | | | | 0.1 Ca suberate | 0.97 | 80.8 |

EXAMPLES 6 to 15

The polypropylene powders (PP) shown in Table 2 were each mixed with 0.05% by weight of magnesium aluminum hydroxycarbonate (MAHC, from Kyowa) as a catalyst deactivator, 0.05% by weight of Ca stearate, 0.05% by weight of Irgafos 168, 0.05% by weight of Irganox 1010 and, in Examples 7, 9, 11, 13 and 15, additionally with 0.1% by weight of Ca pimelate as a β nucleating agent in an intensive mixer and were extruded in a twin-screw extruder at a melt temperature of 230° C. and granulated. The proportion of β-modification in the granules was determined by the DSC method. The values are listed in Table 2.

TABLE 2

| Example | PP | B nucleating agent (0.1%) | B content (DSC/%) |
|---|---|---|---|
| 6 | PP-B | — | less than 2 |
| 7 | PP-B | Ca pimelate | 73.9 |

TABLE 2-continued

| Example | PP | B nucleating agent (0.1%) | B content (DSC/%) |
|---|---|---|---|
| 8 | PP-D | — | less than 2 |
| 9 | PP-D | Ca pimelate | 76.3 |
| 10 | PP-K | — | less than 2 |
| 11 | PP-K | Ca pimelate | 78.0 |
| 12 | PP-CHC | — | 0 |
| 13 | PP-CHC | Ca pimelate | 72.4 |
| 14 | PP-DSC | — | less than 2 |
| 15 | PP-DSC | Ca pimelate | 81.5 |

PP powders used:

PP-B: Propylene homopolymer having a melt flow index (230/2.16) of 0.3 g/10 min

PP-D: Propylene homopolymer having a melt flow index (230/2.16) of 2.0 g/10 min

PP-K: Propylene homopolymer having a melt flow index (230/2.16) of 7.0 g/10 min

PP-CHC: Random propylene/ethylene ($C_3/C_2$)-copolymer having a $C_2$ content of 8 mol % and a melt flow index of 1.2 g/10 min PP-DSC: Heterophase $C_3/C_2$-copolymer having a $C_2$ content of 20 mol % and a melt flow index of 3.2 g/10 min The PP grades used correspond to commercially available PP grades from PCD Polymere. The melt flow index was measured at 230° C./2.16 kg according to ISO 1133/DIN 53735.

Comparative Example V 16

A polypropylene powder having a melt flow index of 7 g/10 min (PP-K) was mixed with 0.05% by weight of Irgafox 168, 0.054 by weight of Irganox 1010 and, according to German Offenlegungsschrift 36 10 644, with 0.1% by weight of Ca stearate and 0.1% by weight of pimelic acid as a β nucleating agent in an intensive mixer and were extruded in a single-screw extruder at a melt temperature of 230° C. and granulated. Sheets having a thickness of 3 mm were injection molded from the granules, and the yellowness index (YI) was measured at a value of 4.9 according to ASTMD 1925. The yellowness index is a measure of the yellowness of the polymer. The proportion of β-PP crystals was 69% according to DSC.

EXAMPLES 17 and 18

PP sheets were produced from PP-K analogously to Comparative Example V 16, except that, instead of Ca stearate and pimelic acid as a β nucleating agent, according to the invention 0.1% by weight of Ca pimelate was added. In Example 17, 0.1% by weight of Ca stearate was also added. In the case of the polypropylenes β-nucleated according to the invention, the yellowness index was −2.6 (Example 17) and −2.2 (Example 18), i.e. substantially better than according to Comparative Example V 16. The proportion of β-PP crystallites was 84.4% (Example 17) and 74.4% (Example 18) according to DSC.

What we claim is:

1. A process for increasing the proportion of the β-modification in polypropylenes, which consists of melting the polypropylenes together with dicarboxylic acid salts of metals of Group IIA of the Periodic Table, said dicarboxylic acids having at least seven carbon atoms, as β nucleating agents and then cooling.

2. The process as claimed in claim 1, in which the dicarboxylic acid is pimelic acid or suberic acid.

3. The process as claimed in claim 1, in which the dicarboxylic acid salt is Ca pimelate or Ca suberate.

4. The process as claimed in claim 1, in which the nucleating agents are used in a concentration of 0.001 to 2% by weight, based on the polypropylene.

5. The process as claimed in claim 1, in which the polypropylenes used have a predominantly stereoregular structure.

* * * * *